United States Patent [19] | [11] Patent Number: 4,904,519
Newman | [45] Date of Patent: Feb. 27, 1990

[54] INK-RECEPTIVE SHEET

[75] Inventor: Donald J. Newman, St. Paul, Minn.

[73] Assignee: Minnesota Mining and Manufacturing Company, St. Paul, Minn.

[21] Appl. No.: 862,135

[22] Filed: May 12, 1986

[51] Int. Cl.[4] .......................... B32B 27/30; B32B 27/34

[52] U.S. Cl. .......................... 428/203; 428/500; 428/519; 428/520; 428/522; 525/333.3

[58] Field of Search .............. 428/518, 519, 515, 203, 428/500, 520, 522; 525/333, 60, 333.3

[56] References Cited

U.S. PATENT DOCUMENTS

| | | | |
|---|---|---|---|
| 2,861,051 | 11/1958 | Caldwell | 525/60 |
| 3,681,079 | 8/1972 | Fitzgerald | 96/114 |
| 3,721,565 | 3/1973 | Fitzgerald | 96/114 |
| 3,730,726 | 5/1973 | Tsuji et al. | 96/84 |
| 4,144,388 | 3/1979 | Yatsu et al. | 525/60 |
| 4,225,652 | 9/1980 | Mercer et al. | 428/519 X |
| 4,301,195 | 11/1981 | Mercer et al. | 427/261 |
| 4,368,275 | 1/1983 | Yanagihara et al. | 525/60 |
| 4,371,582 | 2/1983 | Sugiyama et al. | 428/341 |
| 4,503,111 | 3/1985 | Jaeger et al. | 428/195 |
| 4,541,871 | 9/1985 | Obayashi et al. | 525/60 |

FOREIGN PATENT DOCUMENTS

| | | |
|---|---|---|
| 5475669 | 1/1981 | Japan . |
| 2050866 | 1/1981 | United Kingdom . |

OTHER PUBLICATIONS

"Water Soluble Resins", pp. 106–107; Davidson & Sittig; Reinhold Publications, 1962.
"Water Soluble Polymers Technology & Aplications"; p. 207; Neltzer (1972), Noyes Data Corp.
Crooks and Melz, IBM Technical Disclosure Bulletin, 21, No. 6, Nov. 1978.

*Primary Examiner*—George F. Lesmes
*Assistant Examiner*—J. Davis
*Attorney, Agent, or Firm*—Donald M. Sell; Walter N. Kirn; David L. Weinstein

[57] ABSTRACT

Polymeric composition suitable for preparing an ink receptive coating for a recording sheet and the recording sheet formed therefrom. The composition comprises a hydrolyzed copolymer formed from vinyl amide monomer units and vinyl ester monomer units.

The recording sheets of the invention can be imaged by means of pen plotters on ink jet printers that utilize either water-based inks or solvent based inks. The ink receptive coating formed from the polymeric composition of this invention is resistant to fingerprinting and inhibits clogging of pen tips.

6 Claims, No Drawings

INK-RECEPTIVE SHEET

BACKGROUND OF THE INVENTION

This invention relates to sheet materials, and, in particular, transparent sheet materials comprising an ink-receptive coating.

Polymeric sheet materials, particularly transparent polymeric sheet materials, are commonly used to prepare imaged sheets for projection onto a surface for viewing. One technique for preparing such "visual transparencies" involves depositing ink on the surface of the sheet to provide the desired image. Recently, computer-driven graphic plotting devices have become available which can quickly and precisely generate complex, graphic information. These plotters generally utilize pens or ink jets containing aqueous-based inks or solvent-based inks.

While graphic plotting devices can generate particularly attractive transparencies for visual presentation, the nature of the inks poses problems in the preparation and handling of the transparencies. For example, many sheet materials do not readily accept inks, with the result that the ink beads up on the surface of the sheet, from which it can be inadvertantly removed before it has an opportunity to dry. Other sheet materials that accept the inks to a greater degree often require an extended period of time, e.g. three minutes or more, before the surface thereof is dry enough for handling. This extended drying period greatly increases the opportunity for the image to be smeared during removal of the sheet material from the plotter or during handling and stacking of imaged sheets. Another inking problem is irregular image density, including dots at the end of a pen stroke, and severe striations resulting from the multiple, adjacent pen strokes required to form a large block of color, such as when generating a bar chart, a pie chart, or the like. Another problem is disruption of the surface of the sheet material by the pen nib during printing, i.e. clogging.

Mercer et al. U.S. Pat. No. 4,301,195 describes a transparent film having an ink receptive coating on a transparent backing. The ink receptive coating comprises a mixture of two polymers or individual layers of each polymer. One polymer is the reaction product of an epoxidized, water-insoluble, neutral rubbery polymer with a water-soluble secondary monoamine. The second polymer contains the repeating units.

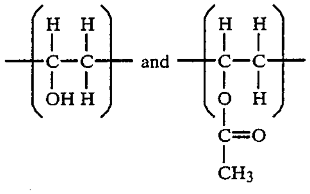

and is frequently referred to as polyvinyl alcohol.

Maekawa et al. U.K. Patent No. 2,050,866 describes an ink jet recording sheet. Their examples include one in which the backing is a polyester film, and the coating is a blend of gelatin and polyvinyl pyrrolidone further containing a high percentage of silica sol (33%). The sheet is quite hazy and unsuitable for projection.

Jaeger et al. U.S. Pat. No. 4,503,111 describes a transparent receptor film for pen plotters and ink jet printers. They teach the use of polyvinyl pyrrolidone and blends of polyvinyl pyrrolidone with a matrix forming polymer that is swellable by water, insoluble at room temperature, but soluble at elevated temperatures. Because the final coating is moisture sensitive, at high humidities, handling of the film often leaves fingerprints thereon.

SUMMARY OF THE INVENTION

In one aspect, this invention involves polymeric compositions suitable for preparing an ink receptive coating for a recording sheet. In another aspect, the invention involves a recording sheet comprising a backing bearing on at least one major surface thereof an ink receptive coating formed from the aforementioned polymeric compositions. The compositions comprise a hydrolyzed copolymer formed from vinyl amide monomer, e.g. vinyl pyrrolidone, units and vinyl ester monomer units, e.g. vinyl acetate. It is preferred that the hydrolyzed copolymer be subsequently cross-linked in order to reduce tackiness of the coating formed therefrom. The polymeric compositions may further contain one or more additional water soluble polymers, e.g. polyvinyl alcohol.

The compositions provide an ink receptive coating for sheets that are to be imaged by means of pen plotters or ink jet printers that utilize water-based inks or solvent-based inks. The coating formed from the polymeric compositions accepts ink readily, is resistant to fingerprinting, and inhibits clogging of pen tips.

DETAILED DESCRIPTION

The compositions for preparing the ink receptive coating of this invention comprise hydrolyzed copolymers formed from vinyl amide monomers and vinyl ester monomers. Preferably, the vinyl amide monomers can contain from 2 to 20 carbon atoms, more preferably from 2 to 6 carbon atoms. Preferably, the vinyl ester monomers can contain from 2 to 20 carbon atoms, more preferably from 2 to 4 carbon atoms. Representative examples of vinyl amide monomers suitable for this invention include vinyl acetamide, vinyl pyrrolidone, acrylamide, N,N'-dimethyl acrylamide. Representative examples of vinyl ester monomers include vinyl acetate, vinyl propionate, vinyl stearate. The weight ratio of vinyl amide monomer units to vinyl ester monomer units in the copolymers can range from 30:70 to 70:30. The copolymers can be hydrolyzed with base, preferably potassium methoxide dissolved in an alcohol solvent, preferably lower alcohol, i.e. one having 1 to 6 carbon atoms, more preferably methanol. Potassium methoxide is prepared by dissolving potassium hydroxide in methanol. The degree of hydrolysis can range from about 80% to about 95% and is preferably about 90%. Hydrolysis occurs primarily to the polyvinyl ester moieties of the copolymer.

Modification of the ink receptive coating by blending other hydrophilic polymers with the hydrolyzed copolymer is possible, so that certain properties, such as ink drying time can be enhanced, if desired. Representative examples of such modifying polymers are polyvinyl alcohol, gelatin, carboxy methyl cellulose, hydroxy ethyl cellulose, vinyl methyl ethers, and the like. A hydrophilic copolymer of methyl vinyl ether with maleic anhydride, available commercially from GAF under the trade name of "Gantrez" AN-149, is useful for imparting hardness and resistance to fingerprinting to the hydrolyzed vinyl amide/vinyl ester copolymer of this invention. This copolymer can also help to reduce pen clogging. The "Gantrez" copolymer can be hydrolyzed before being blended with the vinyl amide/vinyl alcohol copolymer. Hydrolysis converts the anhydride units to acid groups. The acid groups improve water-solubility and hardness. Ethylene-vinyl alcohol is another useful modifying copolymer. By varying the concentration of modifying copolymer in the coating composition blend, the degree of tack and drying rate of the coating composition can be varied.

It is often desirable to add a cross-linking agent or gelling agent to the composition of this invention in order to reduce tackiness of the coatings formed therefrom. Suitable cross-linking agents include dichromates, e.g. ammonium dichromates, titanates, e.g. tetraisopropyl titanate, borates, e.g. potassium borate. A preferred cross-linking agent is boric acid used in conjunction with alcoholic potassium hydroxide. The concentration of cross-linking agent preferably ranges from about 2 to about 8 weight percent based on the weight of polymeric material in the coating composition. An amount lower than about 2 weight percent is generally ineffective. An amount greater than about 8 weight percent generally will not result in additional improvement. An amount greater than 10 weight percent may be detrimental to drying and may cause premature gellation.

The coating compositions can be applied to supporting substrates, such as primed or unprimed polyethylene terephthalate by simple application techniques well known in the art, such as, for example, brushing, spraying, roll coating, bar coating, and the like. Bar coating to a wet film thickness of about 6 mils followed by air drying at elevated temperature (e.g., 200° F.) for five minutes or so are typical coating conditions. Sufficient amount of coating composition should be employed so that the coating formed therefrom will be capable of sorbing substantially all of the anticipated ink deposit. For example, some printers employ three or more colored inks which are blended to provide various colors. Thus, in order to form a black color, a dot of all three colors may be deposited in the same area to form a black dot and the amount of ink deposited may be multiplied by a factor of three or more for the application of some colored images. Generally, ink-receptive layers having a thickness in the range of about 5 to about 50 micrometers are suitable for most applications. Ink-receptive layers of 10 to 20 micrometers have been shown to be especially useful on 100 micrometer thick transparent polyester sheets with multicolor printers. The maximum coating thickness is not critical, so long as the coating remains relatively transparent if transparency of the coating is required.

The ink receptive coating can be applied to any supporting substrate to which it will adhere. It has been found particularly useful in application to transparent films intended for use with overhead projectors such as polyester, acetate, polycarbonate, etc. Such films, which, when untreated are unsuitable for use with ink-jet printers, can be rendered suitable for use with both ink-jet printers and plotters by the application of the coating of the present invention. It is generally desired to coat both sides of thin film substrates to minimize curling effects.

When coatings formed from heretofore known hydrophilic polymers are subjected to conditions of high humidity, they absorb water and soften. These softened coatings generally deform readily during handling, and subsequent projection of a transparency film bearing such a coating reveals dark areas corresponding to the areas deformed by fingerprinting, the pattern formed from a paper slipsheet, etc. Although crosslinking blends of polymers, such as blends containing polyvinyl pyrrolidone and polyvinyl alcohol can bring about a reduction in softening and fingerprinting, rate of drying of inks on the coating is also reduced. When coatings formed from the hydrolyzed vinyl amide/vinyl acetate copolymers of this invention are crosslinked with borates or with aldehydes, hardness of the coating is increased, while ink drying times are not materially changed. Coatings formed from blends of hydrolyzed vinyl amide/vinyl acetate copolymer with hydrolyzed vinyl methyl ether/maleic anhydride copolymer crosslinked with aldehyde provide particularly good ink receptivity and rapid drying time when used with pen plotters, such as the Hewlett Packard model 85-7470A, which utilize inks which typically comprise water soluble direct dyes and acid dyes in hydrophilic solvents such as glycols, water, formamide, ethers, and amides.

The coatings formed from compositions of the present invention exhibit good ink receptivity and drying times with both solvent-based inks and water-based inks.

Practice of various aspects of the present invention can be illustrated by the following non-limiting examples wherein all amounts are in parts by weight or percent by weight unless otherwise stated.

EXAMPLE 1

This example demonstrates the ink receptivity and image optical density properties of a transparency film bearing a coating formed from a hydrolyzed vinyl pyrrolidone/vinyl acetate copolymer.

A commercially available copolymer containing 50% vinyl pyrrolidone monomer units and 50% vinyl acetate units (E535 PVP/VAC, available from GAF) was hydrolyzed with potassium hydroxide (KOH). By adjusting the amount of potassium hydroxide in the hydrolyzing solution, samples of the copolymer were hydrolyzed to various degrees.

The procedure for preparing the transparency films of this example was as follows:

Coating solutions were prepared by dissolving 1 part by weight of a copolymer of vinyl pyrrolidone/vinyl acetate in 3 parts by weight of ethanol. These solutions were treated with potassium hydroxide in the amounts shown in the following table. The potassium hydroxide was added in the form of solid pellets.

TABLE I

| Solution | E535 PVP/VAC copolymer (g) | Ethanol (g) | Potassium hydroxide (g) | Potassium hydroxide (%) |
|---|---|---|---|---|
| I | 75 | 225 | 1.5 | 2 |
| II | 75 | 225 | 3.0 | 4 |
| III | 75 | 225 | 6.0 | 8 |

The resulting three solutions containing the hydrolyzed copolymers were ball-milled for 24 hours. Each of the ball-milled solutions was coated by means of knife coating on 4 mil polyvinylidene chloride primed polyethylene terephthalate film at 3 mil wet thickness and dried at 180° F. for five minutes.

Additional samples of the hydrolyzed copolymers were treated with boric acid or sodium borate in order to bring about crosslinking of the copolymer. Crosslinking may begin in solution and reaches its maximum rate after coating and curing at elevated temperatures. These hydrolyzed, crosslinked copolymers were coated onto 4 mil polyvinylidene chloride primed polyethylene terephthalate film at 3 mil wet thickness and dried in the same manner as the hydrolyzed, non-crosslinked copolymers.

The coatings were evaluated with a Hewlett Packard Model HP 85-7470A pen plotter with aqueous-based inks. Optical density measurements were made with a Macbeth densitometer. The results are shown in Table II.

TABLE II

| Sample No. | Treatment[1] | Image optical density Red ink | Blue/Purple ink |
|---|---|---|---|
| 1 | None | .45 | .38 |
| 2 | 2% KOH | .42 | .42 |
| 3 | 2% KOH, 4% boric acid | .89 | .59 |
| 4 | 2% KOH, 4% sodium borate | .95 | 1.04 |
| 5 | 4% KOH | 1.10 | .85 |
| 6 | 4% KOH, 4% boric acid | 1.31 | .84 |
| 7 | 8% KOH | Too tacky to run | |
| 8 | 8% KOH, 4% boric acid | 1.27 | 1.07 |

[1]Concentration of boric acid and sodium borate is in units of weight percent based on weight of hydrolyzed polymer. It was added as a solution of ethanol.

From the foregoing results, it can be seen that the transparency films bearing a coating of hydrolyzed copolymer provided images having good optical density. As the degree of hydrolysis increased, image optical density also increased. Furthermore, crosslinking did not reduce optical density. When the degree of hydrolysis was so high that the vast majority of the acetate and a few of the pyrrolidone groups were hydrolyzed, the copolymer was so soft that it was too tacky for use with the pen plotter. Crosslinking restored the handling capability while maintaining image optical density at a high level.

EXAMPLE 2

This example demonstrates the ink receptivity and image optical density properties of a transparency film bearing a coating formed from a hydrolyzed vinyl pyrrolidone/vinyl acetate copolymer that differed in composition from that of Example 1. The copolymer employed in this example contained a higher percentage of vinyl acetate units than did the copolymer employed in Example 1.

A commercially available copolymer containing 30% vinyl pyrrolidone units and 70% vinyl acetate units (E335 PVP/VAC, available from GAF) was hydrolyzed with potassium hydroxide (KOH).

The procedure for preparing the transparency films of this example was as follows:

Coating solutions were prepared by dissolving 1 part by weight of a copolymer of vinyl pyrrolidone/vinyl acetate in 3 parts by weight of ethanol. These solutions were treated with potassium hydroxide in the amounts shown in the following table. The potassium hydroxide was added in the form of solid pellets.

TABLE III

| Solution | E335 PVP/VAC copolymer (g) | Ethanol (g) | Potassium hydroxide (g) | (%) |
|---|---|---|---|---|
| I | 75 | 225 | 1.5 | 2 |
| II | 75 | 225 | 3.0 | 4 |
| III | 75 | 225 | 6.0 | 8 |

Each of the resulting solutions was ball-milled for 24 hours. Each of the ball-milled solutions was coated by means of knife coating on 4 mil polyethylene terephthalate film primed with polyvinylidene chloride at 3 mil wet thickness and dried at 180° F. for four minutes.

Additional samples of the hydrolyzed copolymer were treated with boric acid or sodium borate in order to bring about crosslinking. These hydrolyzed, crosslinked copolymers were coated onto 4 mil polyvinylidene dichloride primed polyethylene terephthalate film at 3 mil wet thickness and dried in the same manner as the hydrolyzed, non-crosslinked copolymers.

The coated samples were evaluated with a Hewlett Packard Model HP85-7470A pen plotter with aqueous-based inks. Image optical density measurements were made with a Macbeth densitometer. The results are shown in Table IV.

TABLE IV

| Sample No. | Treatment[1] | Image optical density Red ink | Blue/Purple ink |
|---|---|---|---|
| 9 | None | 0.47 | 0.44 |
| 10 | 2% KOH | 0.62 | 0.60 |
| 11 | 2% KOH, 4% boric acid | 1.33 | 0.55 |
| 12 | 4% KOH | 1.02 | 1.04 |
| 13 | 4% KOH, 4% boric acid | 1.28 | 0.85 |
| 14 | 8% KOH | Too tacky to run | |
| 15 | 8% KOH, 8% boric acid | 0.99 | 1.88 |

[1]Concentration of boric acid is in units of weight percent based on weight of hydrolyzed polymer. It was added as a solution of ethanol.

From the foregoing results, it can be seen that the transparency films bearing a coating of hydrolyzed copolymer provided images having good optical density. As the degree of hydrolysis increased, image optical density also increased. Ink drying time was essentially equivalent for both crosslinked and non-crosslinked coatings, however, crosslinking advantageously affected image optical density and reduced fingerprinting.

EXAMPLE 3

This example demonstrates the image optical density and ink receptivity properties of transparency films bearing coatings formed from blends of various polymers with the hydrolyzed copolymer of the present invention.

The coating composition blends were made by adding aqueous solutions of various polymers to solutions containing (1) a copolymer hydrolyzed with potassium hydroxide and having 30% vinyl pyrrolidone units and 70% vinyl acetate units and (2) glyoxal. In each run 10 g of a 10% aqueous solution of modifying polymer was added to 10 g of a solution containing vinyl pyrrolidone/vinyl acetate copolymer (20%) and glyoxal.

The formulations were coated at 3 mil wet thickness onto a 4 mil polyethylene terephthalate film. The samples were dried at 200° F. (93° C.) for 5 minutes. The coated films were evaluated with a Hewlett-Packard Model HP 85-7470 A pen plotter. Image optical density measurements were made with a Macbeth densitometer. The results are shown in Table V.

TABLE V

| Modifying polymer | Image optical density Green ink | Black ink |
|---|---|---|
| Methyl vinyl ether/maleic anhydride copolymer ("Gantrez" AN-149) | 1.76 | 1.32 |
| Hydroxypropyl cellulose | 0.81 | 0.59 |

TABLE V-continued

| | Image optical density | |
|---|---|---|
| Modifying polymer | Green ink | Black ink |
| Polyvinyl alcohol | 1.37 | 0.83 |

The coatings were clear and provided good image optical density. The coating containing methyl vinyl ether/maleic anhydride copolymer provided excellent resistance to fingerprinting.

EXAMPLE 4

This example demonstrates the effect on pen clogging of the coating of the present invention. Coating solutions were prepared by blending the following ingredients in the amounts indicated. In this example, all amounts are in grams.

TABLE VI

| | 19 | 20 | 21 | 22 |
|---|---|---|---|---|
| Vinyl pyrrolidone/vinyl acetate copolymer (30%/70%), 80-95% hydrolyzed | 2.5 | 2.5 | 2.5 | 2.5 |
| Methyl vinyl ether/maleic acid copolymer ("Gantrez" AN-149, 10% aqueous solution) | 10 | 10 | 10 | 10 |
| Ethanol | 7.5 | 7.5 | 7.5 | 7.5 |
| Glyoxal | 0.25 | 0.50 | 0.75 | 1.0 |
| Water | 5.0 | 5.0 | 5.0 | 5.0 |

Each of the solutions was clear and homogeneous. Each was coated at 3 mil wet thickness on a 4 mil polyethylene terephthalate film. The coated films were dried at 200° F. (93° C.) for 5 minutes. The films were then evaluated on a Hewlett-Packard Model HP 85-7470 A pen plotter. Image optical density measurements were made with a Macbeth densitometer. The results are shown in Table VII.

TABLE VII

| | Image optical density | | |
|---|---|---|---|
| Sample | Green ink | Black ink | Comments |
| 19 | 1.58 | 1.31 | Pen clogging |
| 20 | 1.71 | 1.27 | No clogging |
| 21 | 1.65 | 1.13 | No clogging |
| 22 | 1.75 | 1.25 | No clogging |
| 23 (Control)[1] | 1.70 | 1.37 | No clogging |

[1]Control was polyester sheet coated with hydrolyzed cellulose acetate (T047 film commercially available from Minnesota Mining and Manufacturing Co.).

When the coating is not sufficiently hard, the polymeric coating is removed by the nib of the pen and plugs the end thereof, i.e. pen clogging.

EXAMPLE 5

This example demonstrates the ink receptivity and drying properties of a transparency film bearing a coating formed from a hydrolyzed N,N'-dimethylacrylamide/vinyl acetate copolymer. The copolymer was made by polymerizing 50 parts by weight of dimethylacrylamide with 50 parts by weight of vinyl acetate in an ethanol solution using azobisisobutyronitrile (2% based on weight of monomers) as a polymerization initiator at 60° C. for 24 hours. The copolymer had an inherent viscosity of 0.170 dL/g. A 25% solution of the copolymer in ethanol was treated with solid potassium hydroxide (1.6% based on the weight of the copolymer) for 24 hours in a roller mill. The resulting hydrolyzed material was milky, but became clear when diluted with water.

The hydrolyzed copolymer was coated on 4 mil polyvinylidene chloride primed polyethylene terephthalate film with a knife coater at 3 mils wet thickness and dried at 200° F. for 4 minutes. Evaluation was based on drying time and image density obtained with the Hewlett-Packard model 85-7470A pen plotter. Results are shown in the following table. The drying test was conducted by blotting the image with absorbent paper 15 seconds after formation thereof to determine ink transfer.

TABLE VIII

| | | Image optical density | | |
|---|---|---|---|---|
| Sample no. | Description of coating | Green | Black | Drying at 15 sec. |
| 24 | Control[1] | 1.86 | 0.87 | slight transfer |
| 25 | Unhydrolyzed copolymer | 0.53 | 0.25 | excessive transfer |
| 26 | Hydrolyzed copolymer | 0.32 | 0.21 | excessive transfer |
| 27 | Hydrolyzed copolymer (100 parts) treated with boric acid (2.5 parts) | 0.73 | 0.27 | moderate to slight transfer |
| 28 | Hydrolyzed copolymer (100 parts) treated with glyoxal (5 parts) | 0.94 | 0.24 | slight transfer |
| 29 | Hydrolyzed copolymer (50 parts) treated "Gantrez" AN-149 copolymer (50 parts) and glyoxal (5 parts) | .66 | 0.85 | very slight transfer |

[1]Control was a commercially available pen plotter film comprising a polyester sheet coated with a blend of polyvinyl pyrrolidone/polyvinyl alcohol.

All of the coatings in Table VIII were soft except for the coating containing "Gantrez" AN-149 copolymer.

EXAMPLE 6

This example demonstrates the effect of high humidity on coatings formed from the hydrolyzed copolymer used in this invention. A series of coating compositions were made using hydrolyzed vinyl pyrrolidone/vinyl acetate copolymer (E335 PVP/VAC) and various amounts of hydrolyzed vinyl methyl ether/maleic anhydride copolymer ("Gantrez" AN-149). In all cases the substrate was polyethylene terephthalate.

TABLE IX

| | A | B | C | D | E | F | G | H |
|---|---|---|---|---|---|---|---|---|
| Hydrolyzed N—vinyl pyrrolidone/ vinyl acetate | 10 | 10 | 10 | 10 | 10 | 10 | 10 | 10 |
| Vinyl methyl ether/maleic anhydride[2] | 1.0 | 3.0 | 5.0 | 7.5 | 10 | 15 | 30 | 50 |
| Water | 5 | 5 | 5 | 5 | 5 | 5 | 5 | 5 |
| Glyoxal[3] | 0.5 | 0.5 | 0.5 | 0.5 | 0.5 | 0.5 | 0.5 | 0.5 |
| Coating orifice (mil) | 4 | 4 | 4 | 3 | 3 | 3 | 3 | 3 |
| Coating wt. (g/ft$^2$) | .84 | 1.02 | 1.02 | .72 | .72 | .72 | .72 | .72 |

[1]25% ethanol solution; copolymer comprised 30% vinyl pyrrolidone units and 70% vinyl acetate units.
[2]10% aqueous solution.
[3]40% aqueous solution.

The coated films were placed in an 85° F./80% relative humidity oven with bond paper interleafs; an additional 346 gram weight was applied over the uppermost paper. The coatings absorbed moisture from the environment and either developed a tendency to adhere to the paper interleaf or developed a pattern from the texture of the paper. This pattern was visible in the projected image when the film was placed on the state of an overhead projector. The results are shown in Table X.

TABLE X

| | A | B | C | D | E | F | G | H |
|---|---|---|---|---|---|---|---|---|
| Image Density[1] | | | | | | | | |
| Green | 1.76 | 1.85 | 1.88 | 1.58 | 1.66 | 1.64 | 1.70 | 1.33 |
| Black | 1.08 | 1.27 | 1.33 | 1.15 | 1.18 | 1.19 | 1.38 | 1.20 |
| Clog of pen | fail | pass | pass | pass | pass | pass | pass | fail |
| Humidity test | fail | mod. pattern | mod. pattern | slight pattern | pass | pass | pass | pass |

[1]Images were made on a Hewlett-Packard Model 85-7470A pen plotter with green and with black ink. These inks are based on a glycol-water solvent.

As the vinyl methyl ether/maleic anhydride concentration increased, the film showed improvement in resisting the effect of moisture on the surface. The increase in moisture resistance did not sacrifice the image densities. Pen clogging was also satisfactory.

Various modifications and alterations of this invention will become apparent to those skilled in the art without departing from the scope and spirit of this invention and it should be understood that this invention is not to be unduly limited to the illustrative embodiments set forth herein.

What is claimed is:

1. A recording sheet comprising a transparent polymeric backing having on at least one major surface thereof a transparent, ink-receptive layer comprising a crosslinked, hydrolyzed copolymer of from about 30% to about 70% of vinyl ester comonomer selected from the group consisting of vinyl acetate, vinyl propionate, and vinyl stearate, and about 70% to about 30% of a vinyl amide comonomer selected from the group consisting of N-vinyl pyrrolidone and vinyl acetamide, the degree of hydrolysis being from about 80% to about 95% and the crosslinking being effected by an agent selected from the group consisting of borates, titantes, dichromates and aldehydes in an amount of about 2% to about 8% by weight based on the weight of polymeric material in said ink-receptive layer.

2. The recording sheet of claim 1 wherein said vinyl ester comonomer is vinyl acetate.

3. The recording sheet of claim 1 wherein said vinyl amide comonomer is N-vinyl pyrrolidone.

4. The recording sheet of claim 1 wherein said crosslinking is effected by a borate.

5. The recording sheet of claim 1 wherein said crosslinking is effected by an aldehyde.

6. The recording sheet of claim 5 wherein said aldehyde is glyoxal.

* * * * *

UNITED STATES PATENT AND TRADEMARK OFFICE

CERTIFICATE OF CORRECTION

PATENT NO. : 4,904,519

DATED : FEBRUARY 27, 1990

INVENTOR(S) : DONALD J. NEWMAN

It is certified that error appears in the above-identified patent and that said Letters Patent is hereby corrected as shown below:

Col. 9, line 21, "state" should be --stage--.

Signed and Sealed this

Twenty-fifth Day of June, 1991

*Attest:*

HARRY F. MANBECK, JR.

*Attesting Officer*

*Commissioner of Patents and Trademarks*